United States Patent
Edelen et al.

(10) Patent No.: US 9,649,984 B2
(45) Date of Patent: May 16, 2017

(54) POWER LADDER SYSTEM FOR AGRICULTURAL VEHICLES

(71) Applicants: Brian Edelen, Brooklyn, IA (US); Dustin Cummings, Malcom, IA (US)

(72) Inventors: Brian Edelen, Brooklyn, IA (US); Dustin Cummings, Malcom, IA (US)

( * ) Notice: Subject to any disclaimer, the term of this patent is extended or adjusted under 35 U.S.C. 154(b) by 0 days.

(21) Appl. No.: 14/879,592

(22) Filed: Oct. 9, 2015

(65) Prior Publication Data

US 2016/0101739 A1 Apr. 14, 2016

Related U.S. Application Data

(60) Provisional application No. 62/062,316, filed on Oct. 10, 2014.

(51) Int. Cl.
*B60R 3/02* (2006.01)
*A01B 76/00* (2006.01)
*A01D 41/12* (2006.01)
*A01D 75/20* (2006.01)

(52) U.S. Cl.
CPC ............. *B60R 3/02* (2013.01); *A01B 76/00* (2013.01); *A01D 41/1261* (2013.01); *A01D 75/20* (2013.01)

(58) Field of Classification Search
CPC .. B60R 3/00; B60R 3/02; B60R 3/005; B60R 3/007; B61D 23/02; B61D 23/025; A01B 76/00; A01D 41/1261
See application file for complete search history.

(56) References Cited

U.S. PATENT DOCUMENTS

| | | | | |
|---|---|---|---|---|
| 3,232,376 A | * | 2/1966 | Lucas | A01D 41/1261 182/113 |
| 4,245,716 A | * | 1/1981 | Rayfield | A01D 41/1261 182/127 |
| 5,813,494 A | * | 9/1998 | Ulschmid | A01D 41/1261 182/106 |
| 6,178,364 B1 | * | 1/2001 | Delurey | B60R 3/02 105/443 |
| 8,262,113 B1 | * | 9/2012 | Chafey | B60R 3/02 280/163 |
| 8,602,431 B1 | * | 12/2013 | May | B60R 3/02 280/163 |
| 2006/0011416 A1 | * | 1/2006 | Gonzalez y Gil | E02F 9/0833 182/127 |

* cited by examiner

*Primary Examiner* — Frank Vanaman
(74) *Attorney, Agent, or Firm* — Christopher A. Proskey; BrownWinick Law Firm

(57) ABSTRACT

A power ladder system for an agricultural vehicle includes an agricultural vehicle having a stationary platform and a movable platform with a ladder section connected to the movable platform. An actuator is connected to the movable platform which is configured to move the movable platform between a retracted position and an extended position. An engagement member selectively connects the actuator to the movable platform such that when the engagement member is disengaged the movable platform may be manually operated. The system is configured to automatically extend or retract the movable platform based on various inputs such as pressing a button on a remote or on the ladder, placing the agricultural vehicle in a drive mode, sensing motion of the agricultural vehicle, and opening the door, among other triggers.

20 Claims, 6 Drawing Sheets

POWER LADDER SYSTEM FOR AGRICULTURAL VEHICLES

FIELD OF THE INVENTION

This invention relates to a ladder system. More specifically and without limitation, this invention relates to a power ladder system for agricultural vehicles.

BACKGROUND OF THE INVENTION

Modern agriculture has become increasingly mechanized. The development and use of combines, tractors and an endless array of other tools, equipment and implements have increased the efficiency of farming. Due to the increased efficiency of farming, the size of farming operations has grown over time, with each farmer farming more and more land. Due to the increase in the size of farms, farmers require that their equipment be capable of farming more land. And so goes this self-reinforcing cycle of ever growing farms and ever growing farming equipment.

One result of this self-reinforcing cycle is that farm equipment has grown in size. As one example, the height, width, weight and power of tractors and combines and other agricultural vehicles has increased (the term "agricultural vehicles" is used broadly herein to describe all forms of vehicles used in agriculture). As the height of agricultural vehicles has increased, ladders were needed to facilitate farmers to climb up into the agricultural vehicle. However, because the width of these agricultural vehicles has also grown, it is unsafe and undesirable to have a fixed ladder sticking out from the side of the agricultural vehicle.

To cure this problem, manufactures added selectively rotating ladders to their equipment. One such manufacturer is John Deere. Many John Deere combines, presently come from the factory with a ladder section connected to a movable platform. This movable platform is rotatably connected to a stationary platform. To move the movable platform from a retracted position to an extended position, or from an extended position to a retracted position, a lever is depressed, generally by the user's foot, and the user manually applies a rotational force to the movable platform with respect to the stationary platform, thereby swinging the movable platform and the ladder section from one position to another.

While this arrangement is effective, it is awkward, inconvenient, difficult, time consuming, tiring and unsafe for the operator. In fact, it is so difficult that many people, such as old, overweight or injured operators, are unable to perform this task because swinging the ladder is too awkward or difficult, while some find that reaching the somewhat hidden lever while remaining on the narrow stationary platform requires too much balance and dexterity.

In addition, manually activating the ladder is dangerous. This is because the lever is somewhat hidden and requires the user to stand on one leg while pressing the lever while they simultaneously apply force to the movable portion of the ladder in an attempt to rotate it. Since the stationary platform is so high above the ground in the event that the user slips and falls off the narrow platform, the fall to the ground far below is certain to be injurious, and can be life threatening.

In view of these and other deficiencies, there is a need in the art to improve these safety and design deficiencies.

Thus, it is a primary object of the invention to provide a power ladder system for agricultural vehicles that improves upon the state of the art.

Another object of the invention is to provide a power ladder system for agricultural vehicles that is easy to use.

Yet another object of the invention is to provide a power ladder system for agricultural vehicles that is automatic.

Another object of the invention is to provide a power ladder system for agricultural vehicles that improves the safety of agricultural vehicles.

Yet another object of the invention is to provide a power ladder system for agricultural vehicles that does not require manual operation.

Another object of the invention is to provide a power ladder system for agricultural vehicles that eliminates the awkward process of opening and closing of conventional ladder systems.

Yet another object of the invention is to provide a power ladder system for agricultural vehicles that improves the efficiency and operator safety of entering and exiting agricultural vehicles.

Another object of the invention is to provide a power ladder system for agricultural vehicles that provides a manual override in the event that the powered system is not functional.

Yet another object of the invention is to provide a power ladder system for agricultural vehicles that is easy to install.

Another object of the invention is to provide a power ladder system for agricultural vehicles that can be installed onto any agricultural vehicle.

Yet another object of the invention is to provide a power ladder system for agricultural vehicles that is inexpensive to manufacture.

Another object of the invention is to provide a power ladder system for agricultural vehicles that has a long useful life.

Yet another object of the invention is to provide a power ladder system for agricultural vehicles that is durable.

Another object of the invention is to provide a power ladder system for agricultural vehicles that has an intuitive design.

Yet another object of the invention is to provide a power ladder system for agricultural vehicles that can be retrofitted to any existing or potentially future agricultural vehicle.

These and other objects, features, or advantages of the present invention will become apparent from the specification and claims.

SUMMARY OF THE INVENTION

A power ladder system for an agricultural vehicle includes an agricultural vehicle having a stationary platform and a movable platform with a ladder section connected to the movable platform. An actuator is connected to the movable platform which is configured to move the movable platform between a retracted position and an extended position. An engagement member selectively connects the actuator to the movable platform such that when the engagement member is disengaged the movable platform may be manually operated. The system is configured to automatically extend or retract the movable platform based on various inputs such as pressing a button on a remote or on the ladder, placing the agricultural vehicle in a drive mode, sensing motion of the agricultural vehicle, and opening the door, among other triggers.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention (s). The following detailed description is, therefore, not to be taken in a limiting sense, and the scope of the invention(s) is defined only by the appended claims, along with the full scope of equivalents to which such claims are entitled.

As used herein, the terminology such as vertical, horizontal, top, bottom, front, back, end, sides and the like are referenced according to the views and figures presented. It should be understood, however, that the terms are used only for purposes of description, and are not intended to be used as limitations. Accordingly, orientation of an object or a combination of objects may change without departing from the scope of the invention.

As used herein, the term agricultural vehicle is used to describe all vehicles used in agricultural production. This term is to be construed broadly and includes tractors, combines, manure spreaders, sprayers, trucks, ATVs and the like. However, the invention is not limited to agriculture vehicles, and instead reference to agricultural vehicles is simply an example. It is hereby Contemplated that the invention(s) described herein is applicable to any vehicle and/or mechanical system where it is beneficial and useful.

Figure 1:
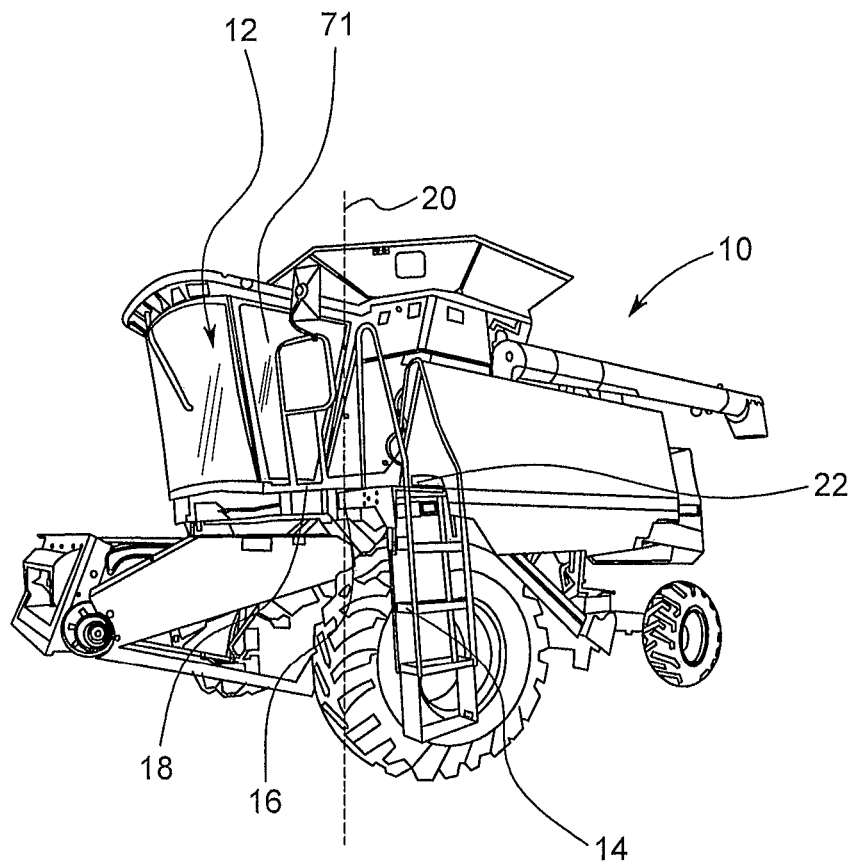
FIG. 1 is a perspective view of an agricultural vehicle, as one example a combine, having a ladder section connected to a movable platform that is rotatably connected to a stationary platform such that the ladder section is movable between an extended position and a retracted position, the movable platform having a lever that allows for movement of the movable platform.
Figure 2:
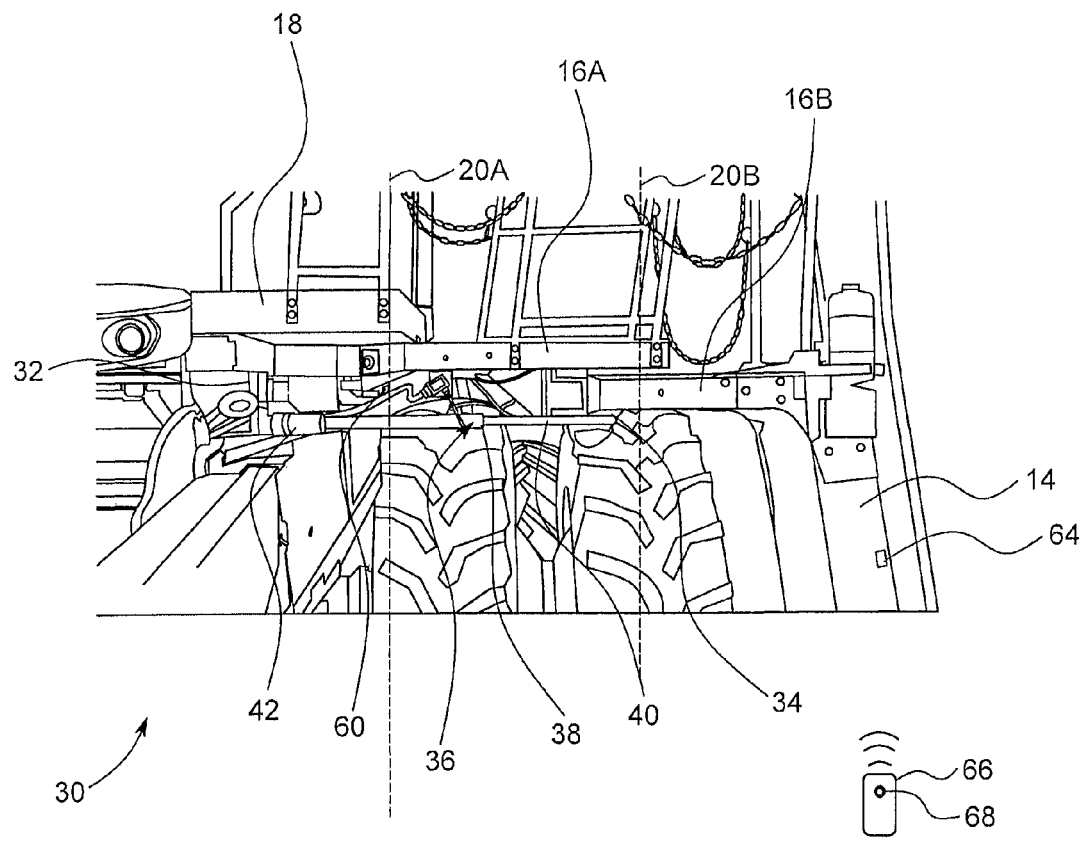
FIG. 2 is a perspective view of an agricultural vehicle, as one example a combine, having a ladder section connected to a first and second movable platform that are rotatably connected to a stationary platform such that the ladder section is movable between an extended position and a retracted position, the view showing a powered system that includes an actuator operably connected to the stationary platform and the movable platforms that is configured to move the ladder section between an extended position and a retracted position, the actuator formed of a self-contained hydraulic or pneumatic piston.

With reference to FIG. 1, a prior art—conventional combine (or agricultural vehicle) 10 is presented. The combine 10 includes a cab 12 that is positioned high above the ground due to the size of the combine 10. To access the combine 10 a ladder section 14 is connected to a movable platform 16. This movable platform 16 is rotatably connected to a stationary platform 18 at a pivot axis or pivot point 20. The movable platform 16 swings between a retracted position, wherein the ladder section 14 is pulled close to the body of the combine 10, and an extended position wherein the ladder section 14 is extended in an outward alignment to the body of the combine 10 (which is the position shown in FIG. 1). To move the movable platform 16 from the retracted position to the extended position or from the extended position to the retracted position, a lever 22 is depressed by the user, generally using their foot, and the user manually applies rotational pressure to the movable platform 16 thereby manually swinging it from one position to another.

In some arrangements, to accommodate larger combines 10, especially those with dual front wheels, the movable platform 16 may have two connected parts or platforms that move, such as a movable first platform 16A and a movable second platform 16B. In this arrangement, the movable first platform 16A rotates upon a first pivot point or pivot axis 20A and the movable second platform 16B rotates upon a second pivot point or pivot axis 20B. Any number of movable platforms 16 may be used without departing from the spirit and scope of the invention, and is hereby contemplated. While the system described herein works in the same or similar manner with one or multiple platforms, for clarity purposes reference to a single movable platform 16 herein shall inherently include reference to any number of movable platforms.

To improve upon manual operation, a powered system 30 is provided. The powered system 30 includes an inner mount 32. Inner mount 32 is formed of any suitable size, shape and design and serves to connect the powered system 30 to the combine 10. Or, said another way, inner mount 32 connects one end of actuator 36 to combine 10. In one arrangement, as is shown, the inner mount 32 is connected to the bottom of the stationary platform 18. Alternatively, inner mount 32 is connected to any other portion of the combine 10 other than the movable portions of the system 30, such as movable platform 16 or ladder section 14.

The powered system 30 also includes an outer mount 34. Outer mount 34 is formed of any suitable size, shape and design and serves to connect the powered system 30 to the movable platform 16, or alternatively to any other movable portion of the ladder assembly 14. Or, said another way, outer mount 34 connects one end of actuator 36 to the movable platform 16 and/or ladder assembly 14. In one arrangement, as is shown, the outer mount 34 is connected to the bottom of the movable platform 16. Alternatively, outer mount 16 is connected to any other movable portion of the ladder assembly 14.

Inner mount 32 and outer mount 34 serve as mounts for actuator 36. More specifically, the inner end of actuator 36 is connected to inner mount 32 and the outer end of actuator 36 is connected to outer mount 34. Actuator 36 is any form of a device that converts energy into motion, such as a hydraulic pump or cylinder, a pneumatic pump or cylinder, an electric motor, a solenoid, a screw drive system, a chain drive system or the like or any combination thereof. In one arrangement, as is shown, actuator 36 is a hydraulic or pneumatic cylinder having a housing 38 with a hydraulic piston positioned therein that forces a piston rod 40 to extend out of and retract within housing 38.

In the arrangement shown, actuator 36 includes a self-contained bi-directional DC motor driven pump 42 that is integral with the housing 38 and piston rod 40. The self-contained bi-directional DC motor driven pump 42 includes an electrical and control lead 44 that is electrically connected with the control system 45 of the combine 10. By being a self-contained system, actuator 36 can be installed in a quick, efficient and easy manner. That is, the actuator 36 is mechanically installed onto the combine 10 and then electrically connected using control lead 44, which are readily, inexpensively and easily attachable to control system 45. This eliminates the need to attach a hydraulic connection from combine 10 to actuator 36, which simplifies installation as hydraulic lines can be complicated to install and expensive. In addition, most combines 10 lack additional or convenient accessory hydraulic attachments, and even if the combine 10 included additional hydraulic attachment points, the position of the actuator 36 is inconvenient for attachment to the internal hydraulic system of combine 10 as it is spaced away from potential hydraulic connections. For these reasons the self-contained nature of the actuator 36 having a motor driven pump 42 that is integral with housing 38 and piston rod 40 provides efficiency, simplicity and ease of installation.

The control system 45 of the combine 10 transmits electrical power and/or control signals to self-contained bi-directional DC motor driven pump 42 through lead 44. Self-contained bi-directional DC motor driven pump 42 converts the power and/or control signals to generate pressure (hydraulic or pneumatic) which is then fed to the housing 38 to actuate piston rod 40. Depending on the direction the pump 42 is driven depends whether the piston rod 40 is driven out or pulled within the housing 38 thereby moving the movable platform 16 and ladder section 14 between a retracted position and an extended position.

As the piston rod 40 moves in and out of housing 38 of actuator 36 the angle of the movable platform 16 changes as it swings between a retracted position and an extended position. To accommodate this angular movement, actuator 36 is connected to inner mount 32 at an inner pivot point 46, which allows for angular rotation of the inner end of actuator 36 on inner mount 32. Similarly, to accommodate this angular movement, actuator 36 is connected to outer mount 34 at an outer pivot point 48, which allows for angular rotation of the outer end of actuator 36 on outer mount 34. In one arrangement, inner pivot point 46 and outer pivot point 48 is a vertically oriented axle or shaft that extends through an opening 50 in the inner end of actuator 36, and extends through an opening 52 in the outer end of actuator 36, respectively. Once inner pivot point 46 is inserted through the opening 50 in the inner end of actuator 36 a locking device 54 is installed on the inner pivot point 46 thereby holding the actuator 36 onto the inner pivot point 46 while allowing for angular rotation thereon. Similarly, once outer pivot point 48 is inserted through the opening 52 in the outer end of actuator 36 a locking device 56 is installed on the outer pivot point 48 thereby holding the actuator 36 onto the outer pivot point 48 while allowing for angular rotation thereon. Locking device 54, 56 is any device that holds two components together while being removable. In the arrangement shown, locking device 54, 56 is a locking pin, such as a clevis pin, however any other device is hereby contemplated for use such as a spring loaded pin, a detent, a quick detach device, a threaded nut, or the like mechanical device.

One benefit to using a locking pin or other quickly removable device as locking device 54/56 to hold actuator 36 onto inner pivot point 46 and outer pivot point 48 is in the event that the actuator 36 fails to work, such as in the event that actuator 36 breaks or combine 10 is out of power, the user can simply reach up (or down if they are standing on the stationary platform 18) and remove one or both locking devices 54/56 thereby quickly and easily allowing the movable platform 16 to again be manually moved. This eliminates the possibility of someone being stuck on the stationary platform 18 with the ladder section 14 in a retracted position. Or, conversely, this eliminates the possibility of someone being stuck with an extended ladder section 14 when they need to drive down the road.

The configuration of opening 50 on the inside end of actuator 36 fitting over inner pivot point 46 and being locked in place by locking device 54 is herein considered an engagement member or a manner of engaging actuation device 36 between combine 10 and movable platform 16 or ladder section 14. Similarly, the configuration of opening 52 on the outside end of actuator 36 fitting over inner pivot point 48 and being locked in place by locking device 56 is herein considered an engagement member or a manner of engaging actuation device 36 between combine 10 and movable platform 16 or ladder section 14. This engagement member can easily be engaged by placing opening 50/52 over pivot point 46/48 and placing locking device 54/56 in place. This engagement member can easily be disengaged by removing locking device 54/56 and sliding opening 50/52 off of pivot point 46/48. When the engagement member is engaged the movable platform 16 and the ladder section 14 is moved by activation of the actuator 36. In contrast, when the engagement member is disengaged the movable platform 16 and ladder section 14 is manually movable. This arrangement allows for quick and easy conversion from motorized movement to manual movement.

To improve operation of the actuator 36 and to ensure smooth rotation over a long period of time on inner pivot point 46 and outer pivot point 48, grease fittings 58 are installed on or within or adjacent openings 50, 52 of actuator 36 so as to provide a conduit for grease to be applied to the bearing surfaces between openings 50/52 and pivot points 46/48, respectively. Alternatively, grease fittings 58 are positioned on pivot points 46/48. In one arrangement, grease fittings include a nipple that a grease gun attaches to. The pressure supplied by the grease gun forces a small captive bearing ball in the fitting to move back against the force of its retaining spring. The arrangement is thus essentially a valve that opens under pressure to allow lubricant to pass through a channel and be forced into the voids of the bearing. When the pressure ceases, the ball returns to its closed position. The ball excludes dirt and functions as a check valve to prevent grease escaping back out of the fitting. The ball is almost flush with the surface of the fitting so that it can be wiped clean to reduce the amount of debris carried with the grease into the bearing. The convex shape of the fitting allows the concave tip of the grease gun to seal against the fitting easily from many angles, yet with a sufficiently tight seal to force the pressured grease to move the ball and enter the fitting, rather than simply oozing past this temporary annular (ring-shaped) seal.

The system 30 includes one or more limit switches 60. Limit switches 60 deactivate movement of the actuator 36 when the actuator reaches the fully extended position and/or the fully retracted position. In one arrangement, limit switches 60 are external to actuator 36. In this arrangement, a retract limit switch 60 is positioned at a position wherein a portion of the movable platform 16 and/or ladder section 14 engages the limit switch 60 at a fully retracted position. When this occurs, the pump 42 is deactivated and the movable platform 16 and ladder section 14 are held in a retracted position. Similarly, in this arrangement, an extend limit switch 60 is positioned at a position wherein a portion of the movable platform 16 and/or ladder section 14 engages the limit switch 60 at a fully extended position. When this occurs, the pump 42 is deactivated and the movable platform 16 and ladder section 14 are held in an extended position.

In an alternative arrangement, limit switch 60 is positioned within actuator 36 and/or within self-contained bi-directional DC motor driven pump 42. In this arrangement, when motion of the actuator 36 engages the limit switch 60 which is internal to the actuator 36, such as a portion of the piston rod 40 reaching a fully extended position or a fully retracted position, the power is cut to the pump 46 and the position of the movable platform 16 and ladder section 14 is held.

In one arrangement, actuator 36 and/or self-contained bi-directional DC motor driven pump 42 includes a microprocessor 62 which receives and processes control signals and information from the control system 45 of combine 10 as well as limit switches 60 and from this information controls operation of pump 42.

The powered system 30 is activated to move the movable platform 16 and ladder section 14 between an extended position and a retracted position in a plurality of ways. In one arrangement, a button 64 is placed on or near ladder section 14 at a convenient position for a user to press when they approach the combine 10. Button 64 is electrically and/or wirelessly connected with the control system 45 of combine 10 and/or microprocessor 62 of actuator 36 such that when it is pressed the actuator is actuated 36 to move to an extended position from a retracted position, or conversely to a retracted position from an extended position. Similarly, a remote control 66 having an activation button 68 thereon is wirelessly connected with the control system 45 of combine 10 and/or microprocessor 62 of actuator 36 such that when it is pressed the actuator is actuated 36 to move to an extended position from a retracted position, or conversely to a retracted position from an extended position. In the arrangement wherein button 64 is wireless and/or a remote control 66 is utilized, either control system 45 of combine and/or microprocessor 62 of actuator 36 includes an antenna, receiver or transceiver and other electrical componentry needed to receive, process and respond to the wireless control signals transmitted by remote 66.

In another arrangement, a button 70 is placed within cab 12 of combine 10 at a convenient position for an operator in the cab 12 to activate. Cab button 70 is either wired into the control system 45 or is wirelessly connected to control system 45 and/or actuator 36. As one example, cab button 70 is used by an operator when they want to extend the retracted ladder section 14 to pick up an additional person to ride in the combine and then retract the ladder section 14 and then retract the ladder section 14 once the passenger has climbed into the cab.

In another arrangement, a door sensor 72 is associated with the door of cab 12 that detects when the door 71 is opened or closed, indicating that an operator is either entering or exiting the cab 12. When the door sensor 72 is activated and the ladder section 14 is in a retracted position, the actuator 36 moves the ladder section 14 to an extended position. When the door sensor 72 is activated and the ladder section 14 is in an extended position, the actuator 36 moves the ladder 14 to a retracted position.

In one arrangement, door sensor 72 is used in association with a cab sensor 73 which detects whether an occupant is within the cab 12 of combine 10. In this arrangement, control system 45 uses the information from both cab sensor 73 and door sensor 72 to appropriately activate actuator 36. As one example, using door sensor 72 and cab sensor 73, when cab sensor 73 detects an occupant within the cab 12 and the door sensor 72 detects that the door 71 has been opened, and the control system 45 knows that the ladder section 14 is in a retracted position (in one arrangement by detection of limit switches 60) the control system 45 is programmed to activate the actuator 36 to move the ladder section 14 to an extended position based on the assumption that the occupant opened the door 71 to exit the combine 10. In a similar, but opposite situation, as another example, using door sensor 72 and cab sensor 73, when cab sensor 73 detects no occupant within the cab 12 and the door sensor 72 detects that the door 71 has been opened, and the control system 45 knows that the ladder section 14 is in an extended position (in one arrangement by detection of limit switches 60) the control system 45 is programmed to activate the actuator 36 to move the ladder section 14 to a retracted position based on the assumption that the occupant opened the door 71 to enter the combine 10. In a similar arrangement, as another example, using door sensor 72 and cab sensor 73, when cab sensor 73 detects an occupant within the cab 12 and the door sensor 72 detects that the door 71 has been closed, and the control system 45 knows that the ladder section 14 is in an extended position (in one arrangement by detection of limit switches 60) the control system 45 is programmed to activate the actuator 36 to move the ladder section 14 to a retracted position based on the assumption that the occupant closed the door 71 to begin operating the combine 10.

In any of these arrangements, it may be desirable to implement a time delay through microprocessor 62. That is, the microprocessor 62 delays operation of actuator 36 after the occurrence of any trigger events, such as opening or closing of door 71. This delay, allows the operator ample time to climb up or down the ladder, or change their mind and re-open or re-close the door 71 before the actuator 36 is initiated.

Many conventional combines 10 include a road button or road setting 74 that when activated prevents many components of the combine 10 from being activated which would cause problems when driving down the road. As an example, when the road button 74 is activated, the operator cannot accidently extend the auger or begin discharging grain which would be a tremendous hazard to both the operator, the combine 10 and others on the road. As another example, when the road button 74 is activated, the operator cannot accidently turn on the head or the separator system, which similarly would be hazardous. In one arrangement, the road button 74 is associated with the actuator 36 such that when the road button 74 is activated, the actuator 36 is locked in place, or alternatively the actuator 36 is moved to a retracted position and locked in place. This ensures the ladder section 14 is never accidently extended while driving in the road setting 74 which would cause a substantial safety hazard as combines 10 are generally wide vehicles and extending the ladder section 14 increases the width of the combine 10 creating a safety hazard for the combine 10, the operator and others on the road.

In another arrangement, combine 10 is equipped with a motion sensor or drive sensor 76 that senses when the combine 10 is moving and/or the speed at which the combine 10 is moving. In one arrangement, drive sensor 76 is programmed to sense when combine 10 is moving above a predetermined speed, such as 1 mph, 2 mph, 3 mph, 4 mph, 5 mph or the like. In one arrangement, when the drive sensor 76 senses motion of the combine 10, or that the combine 10 is traveling at a speed greater than a predetermined speed, the control system 45 or microprocessor 62 moves the actuator 36 to a retracted position and holds that position until the combine 10 stops moving or a stationary setting is engaged, such as the parking break or the combine 10 is placed in park. This ensures the ladder section 14 is never accidently extended while driving above a predetermined speed. Conversely, in one arrangement, the microprocessor 62 and/or control system 45 is programmed to extend the ladder section 14 when the combine 10 stops, or when the combine 10 stops for a predetermined amount of time.

In one arrangement, combine 10 is equipped with a drive setting sensor 78 that senses whether combine 10 is in a stationary setting, such as the transmission being in park or the parking break being engaged so as to prevent movement of the combine 10, or a drive setting, such as the transmission being in forward or reverse so as to allow the combine 10 to move. In another arrangement, drive setting sensor 78 is configured to determine if a road setting is engaged or disengaged. In one arrangement, control system 45 and/or microprocessor 62 uses the information from drive setting sensor to ensure that ladder section 14 is in a retracted position when a drive setting is engaged, and allows the ladder section 14 to be in an extended position when a stationary setting is engages. As one example, when the drive setting sensor 78 detects that a drive setting has been engaged, and the control system 45 knows that the ladder section 14 is in an extended position (in one arrangement by detection of limit switches 60) the control system 45 is programmed to activate the actuator 36 to move the ladder section 14 to a retracted position and to lock the ladder section 14 in the retracted position until a stationary setting is engaged. In a similar, but opposite situation, as another example, when the drive setting sensor 78 detects that a drive setting has been disengaged, or said another way, the stationary setting has been engaged, and the control system 45 knows that the ladder section 14 is in a retracted position (in one arrangement by detection of limit switches 60) the control system 45 is programmed to activate the actuator 36 to move the ladder section 14 to an extended position.

In one arrangement, powered system 30 and/or actuator 36 includes a force sensor 80. Force sensor 80 detects the amount of force applied by actuator 36 to move ladder section 14 between an extended position and a retracted position. Microprocessor 62 uses the input from force sensor 80 to ensure actuator 36 is operating within predetermined force parameters. That is, when force sensor 80 provides a signal to microprocessor 62 that exceeds predetermined force parameters, microprocessor 62 deactivates actuator 36, or moves actuator 36 in the opposite direction. In this way, force sensor 80 protects the powered system 30 from damage and protects persons from injury. As one example of use of the force sensor 80, in the event that microprocessor 62 initiates a move to retract ladder section 14 from an extended position to a retracted position and an obstruction is in the way, once ladder section 14 engages the obstruction the force sensor 80 will detect an increase in force. Once this increase in applied force exceeds a predetermined threshold, microprocessor 62 will stop movement of the ladder section 14 so as to prevent damage to the actuator 36, the object the ladder section 14 has engaged and/or the combine 10 itself. Alternatively, once the force sensor 80 detects that force has exceeded predetermined limits, the microprocessor 62 will move the ladder section 14 in the opposite direction. As an example of this, in the event that microprocessor 62 initiates a close of the ladder section 14 and during the closing operation the force sensor 80 detects that the force applied exceeds predetermined levels, the microprocessor 62 stops moving actuator 36 in the closing direction and initiates movement in the opening direction, so long as the force applied to the opening operation does not exceed the predetermined force threshold. This arrangement allows for an obstruction in the closing path to be removed (such as a toolbox left on the movable platform 16, or the like).

Figure 3:
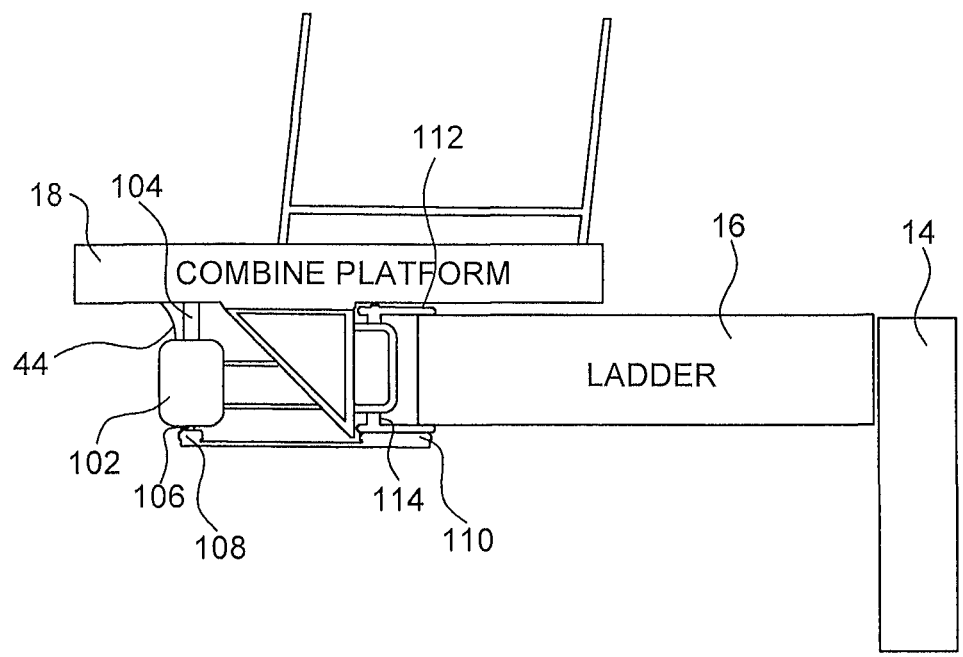
FIG. 3 is a front elevation view of an alternative arrangement of the powered system shown in FIG. 2, the view showing a motor connected to the stationary platform, the motor having a drive gear rotatably mounted to the motor, and a driven gear rotatably mounted to the movable platform, the view showing a belt or chain drive system connecting the drive gear and driven gear.
Figure 4:
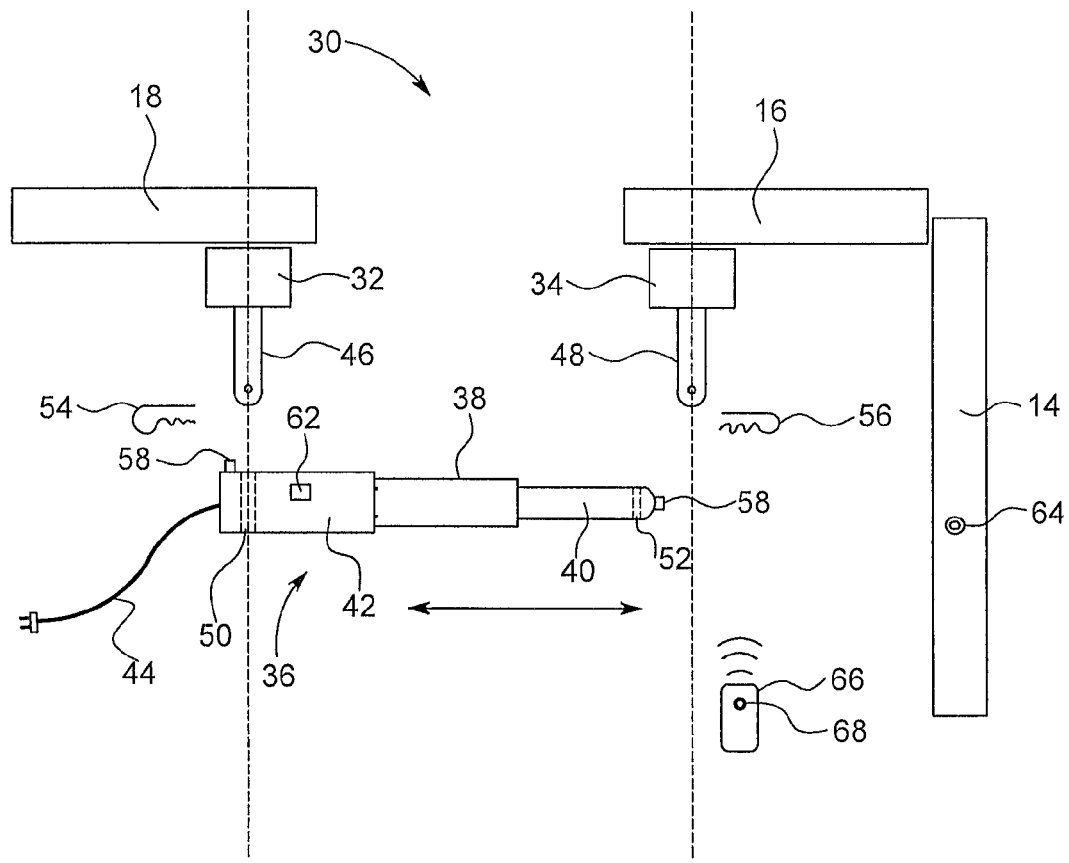
FIG. 4 is a front elevation exploded view of the powered system of FIG. 2.
Figure 5:
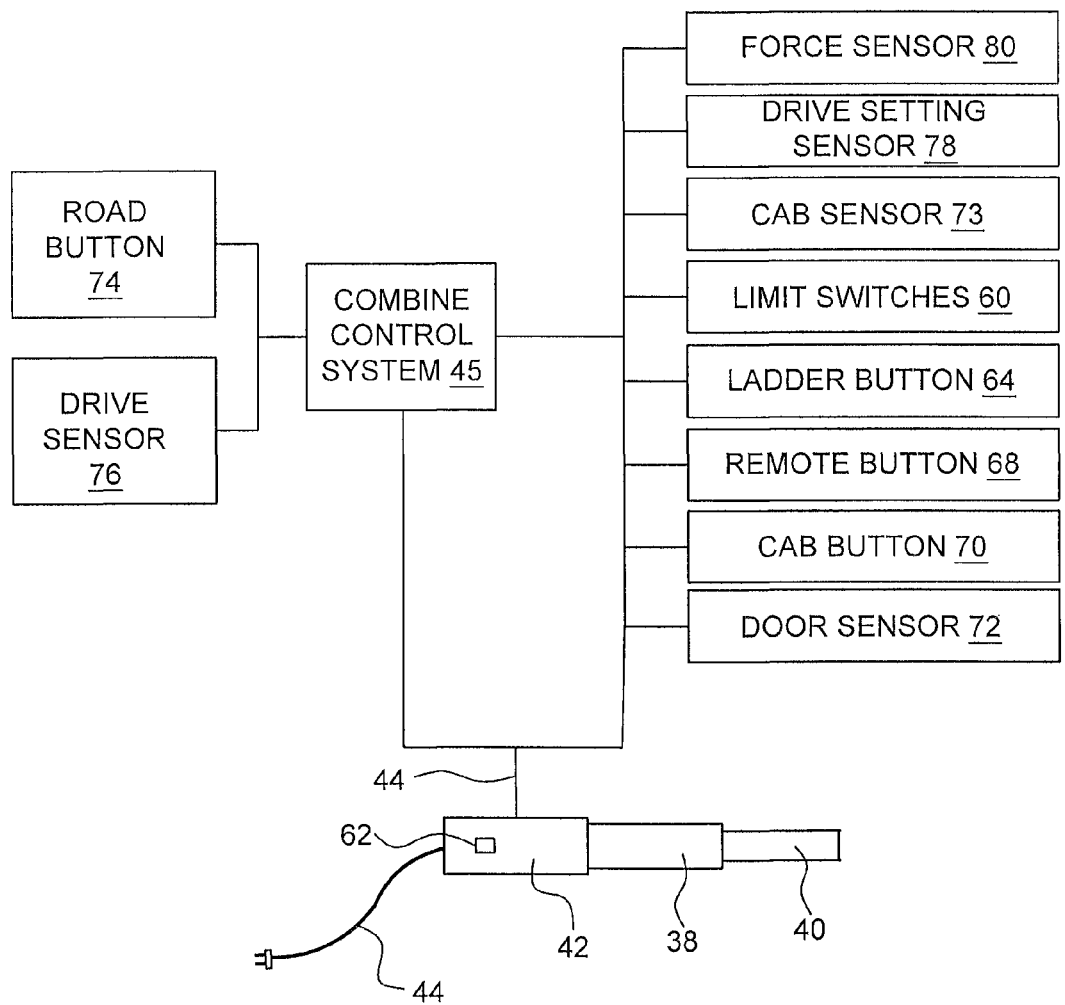
FIG. 5 is a plan view of the interconnection between the components of the powered system, the view showing the actuator, the control system, the microprocessor, and the buttons and sensors of the system.
Figure 6:
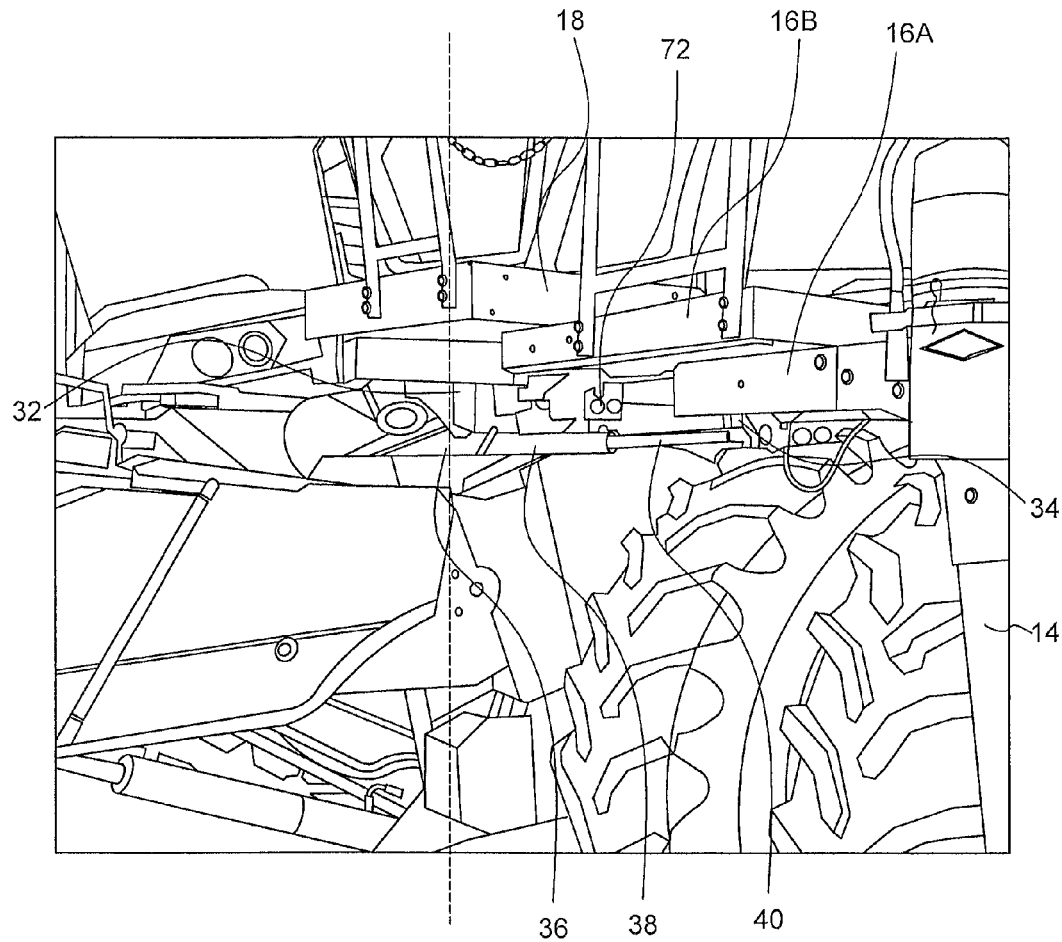
FIG. 6 is another perspective view of the system of FIG. 2, the view particularly showing a limit switch that is engaged when the movable platform is in a fully retracted position.

Alternative Design:

With reference to FIG. 3 an alternative arrangement 100 is presented that is similar to the hydraulic or pneumatic system presented above with a difference being that the alternative arrangement 100 uses an electric, pneumatic or hydraulic powered motor 102 that causes rotation, instead of a hydraulic or pneumatic pump 42 that causes piston rod 40 to extend or retract.

In the alternative arrangement 100, motor 102 is connected to an inner mount 104 that is connected to combine 10 and/or stationary platform 18. Motor 102 includes a driveshaft 106 with a drive gear 108 attached thereto that is driven by driveshaft 106 when motor 102 is activated.

A driven gear 110 is rotatably connected to an outer mount 112 by a driveshaft 114. A belt or chain system 116 connects to and extends between the drive gear 108 and the driven gear 110.

In this arrangement, when the motor 102 is activated, driveshaft 106 is rotated thereby rotating drive gear 108 which, depending on the direction of travel, causes the belt or chain system 116 to rotate around the drive gear 108. This rotation causes the driven gear 110 to rotate which causes movable platform 16 and ladder section 14 to similarly move between a retracted position and an extended position.

All of the above-described sensors, buttons and functions equally apply to this alternative design of FIG. 3.

From the above discussion it will be appreciated that a power ladder system for agricultural vehicles and method of use shown and described herein improves upon the state of the art.

Specifically, the power ladder system for agricultural vehicles and method of use: is easy to use; is automatic; improves the safety of agricultural vehicles; does not require manual operation; eliminates awkward process of opening and closing of conventional ladder systems; improves the efficiency of entering and exiting agricultural vehicles; provides a manual override in the event that the powered system is not functional; is easy to install; can be installed onto any agricultural vehicle; is inexpensive to manufacture; has a long useful life; is durable; has an intuitive design; can be retrofitted to any existing or potentially future agricultural vehicle, among countless other features and advantages.

It will be appreciated by those skilled in the art that other various modifications could be made to the device without parting from the spirit and scope of this invention. All such modifications and changes fall within the scope of the claims and are intended to be covered thereby.

What is claimed is:

1. A power ladder system for an agricultural vehicle having a cab, comprising:
 a stationary platform;
 the stationary platform positioned outside the cab of the agricultural vehicle;
 a movable platform;
 the movable platform pivotally connected to the stationary platform and movable between a retracted position and an extended position;
 a ladder section operably connected to the movable platform;

an actuator operably connected to the movable platform;
the actuator operably connected to a control system of the agricultural vehicle such that the control system controls operation of the actuator;
the agricultural vehicle having a drive setting sensor;
wherein the actuator is configured to move the movable platform between the retracted position and the extended position when activated;
wherein when the drive setting sensor detects a predetermined condition, and the movable platform is in an extended position, the control system activates the actuator thereby moving the movable platform to a retracted position;
wherein the actuator is connected to the movable platform using a detachable locking device;
wherein the detachable locking device is detachable by a user while standing on the stationary platform outside the cab;
wherein when the actuator is in a non-working state, the moveable platform is manually movable by a user standing on the stationary platform by removing the detachable locking device and manually moving the movable platform from the stationary platform.

2. The system of claim 1 wherein when the drive setting sensor detects the predetermined condition, and the movable platform is in a retracted position, the control system prevents activation of the actuator.

3. The system of claim 1 wherein the predetermined condition is engagement of a drive setting, wherein the drive setting prevents at least one of the following functions, extension of an auger, activation of grain discharge, activation of a harvesting head, and activation of a separator system.

4. The system of claim 1 further comprising a second movable platform positioned between the movable platform and the ladder section, wherein the second movable platform is pivotally connected to the movable platform.

5. The system of claim 1 wherein the actuator includes a self-contained bi-directional motor driven pump that controls operation of a hydraulic or pneumatic cylinder to facilitate extension and retraction of the moveable platform without connection to a hydraulic or pneumatic system of the agricultural vehicle.

6. The system of claim 1 further comprising a remote control device wirelessly connected to the control system, wherein the remote control device wirelessly activates the actuator to move the movable platform between a retracted position and an extended position.

7. A power ladder system for an agricultural vehicle having a cab, comprising:
a stationary platform;
the stationary platform positioned outside the cab of the agricultural vehicle;
a movable platform operably connected to the stationary platform and movable between a retracted position and an extended position;
a ladder section operably connected to the movable platform;
an actuator operatively connected to the movable platform;
the actuator operatively connected to a control system of the agricultural vehicle, wherein the control system controls operation of the actuator;
an engagement member operatively connecting the actuator to the movable platform to the vehicle;
wherein when the engagement member is engaged, the actuator is configured to move the movable platform between a retracted position and an extended position when activated;
wherein when the engagement member is disengaged, the movable platform is manually movable between a retracted position and an extended position;
wherein the engagement member is detachable by a user while standing on the stationary platform outside the cab;
wherein when the actuator is in a non-working state, the moveable platform is manually movable by a user standing on the stationary platform by disengaging the engagement member and manually moving the movable platform from the stationary platform.

8. The system of claim 7 wherein the actuator is a self-contained bi-directional motor driven pump that controls operation of a hydraulic or pneumatic cylinder to facilitate extension and retraction of the moveable platform without connection to a hydraulic or pneumatic system of the agricultural vehicle.

9. The system of claim 7 wherein the engagement member includes a removable pin, wherein when the removable pin is installed the engagement member is in an engaged position, and wherein when the removable pin is removed the engagement member is disengaged.

10. The system of claim 9 further comprising a second movable platform positioned between the movable platform and the ladder section, wherein the second movable platform is pivotally connected to the movable platform.

11. The system of claim 7 wherein the control system activates the actuator to move from an extended position to a retracted position in response to a predetermined condition detected by a drive setting sensor or a drive sensor.

12. The system of claim 7 wherein the control system activates the actuator to move from an extended position to a retracted position in response to movement of the agricultural vehicle.

13. The system of claim 7 wherein the control system activates the actuator to move between an extended position and a retracted position in response to activation of a door sensor.

14. The system of claim 7 wherein the control system activates the actuator to move between an extended position and a retracted position in response to reception of a wireless control signal.

15. A power ladder system for an agricultural vehicles having a cab, comprising:
a stationary platform;
the stationary platform positioned outside the cab of the agricultural vehicle;
a movable platform operably connected to the stationary platform and movable between a retracted position and an extended position;
a ladder section operably connected to the movable platform;
an actuator operably connected to the movable platform;
the actuator electronically connected to a control system of the agricultural vehicle such that the control system controls operation of the actuator;
the agricultural vehicle having a drive sensor;
wherein the drive sensor senses when the agricultural vehicle is in motion;
wherein when the drive sensor senses when the agricultural vehicle is in motion the actuator moves the movable platform to a retracted position;

wherein the actuator is connected to the movable platform using a detachable locking device;

wherein the detachable locking device is detachable by a user while standing on the stationary platform outside the cab;

wherein when the actuator is in a non-working state, the moveable platform is manually movable by a user standing on the stationary platform by removing the detachable locking device and manually moving the movable platform from the stationary platform.

16. The system of claim 15 wherein the control system activates the actuator to move from a retracted position to an extended position in response to engagement of a stationary setting.

17. The system of claim 15 wherein the control system activates the actuator to move from a retracted position to an extended position in response to activation of a door sensor.

18. The system of claim 15 wherein the control system activates the actuator to move from a retracted position to an extended position in response to deactivation of the agricultural vehicle.

19. The system of claim 15 wherein the actuator is activated when the drive sensor senses motion of the agricultural vehicle above a predetermined threshold.

20. A power ladder system for an agricultural vehicle having a cab, comprising:
a stationary platform;
the stationary platform positioned outside the cab of the agricultural vehicle;
a movable platform operably connected to the stationary platform and movable between a retracted position and an extended position;
a ladder section operably connected to the movable platform;
an actuator operably connected to the movable platform;
the actuator electronically connected to a control system of the agricultural vehicle such that the control system controls operation of the actuator;
a wireless remote wirelessly connected to the control system;
wherein when the control system receives a wireless signal from the wireless remote, the control system activates the actuator thereby moving the movable platform from a retracted position to an extended position or from an extended position to a retracted position;
wherein the actuator is connected to the movable platform using a detachable locking device;
wherein the detachable locking device is detachable by a user while standing on the stationary platform outside the cab;
wherein when the actuator is in a non-working state, the moveable platform is manually movable by a user standing on the stationary platform by removing the detachable locking device and manually moving the movable platform from the stationary platform.

* * * * *